US012739539B2

(12) United States Patent
Pouya et al.

(10) Patent No.: US 12,739,539 B2
(45) Date of Patent: Sep. 15, 2026

(54) MULTI-RAIL ROUTING AND SPECTRUM ASSIGNMENT

(71) Applicant: CIENA CORPORATION, Hanover, MD (US)

(72) Inventors: Hamed Pouya, Longueuil (CA); Benoît Châtelain, Rosemere (CA)

(73) Assignee: CIENA CORPORATION, Hanover, MD (US)

( * ) Notice: Subject to any disclaimer, the term of this patent is extended or adjusted under 35 U.S.C. 154(b) by 260 days.

(21) Appl. No.: 18/756,951

(22) Filed: Jun. 27, 2024

(65) Prior Publication Data

US 2026/0006354 A1 Jan. 1, 2026

(51) Int. Cl.
*H04Q 11/00* (2006.01)
*H04J 14/02* (2006.01)
*H04L 45/24* (2022.01)

(52) U.S. Cl.
CPC ...... *H04Q 11/0062* (2013.01); *H04J 14/0212* (2013.01); *H04L 45/245* (2013.01); *H04Q 2011/0073* (2013.01); *H04Q 2011/0086* (2013.01)

(58) Field of Classification Search
None
See application file for complete search history.

(56) References Cited

U.S. PATENT DOCUMENTS 8,270,831 B2 * 9/2012 Tanzi .................. H04J 14/0257 398/68
8,374,502 B2 * 2/2013 Bernstein ............ H04J 14/0238 398/48
9,054,955 B2 * 6/2015 Handelman ............ H04B 10/27
9,252,912 B2 * 2/2016 Xia ..................... H04J 14/0257
9,338,529 B2 * 5/2016 Sambo ................ H04J 14/0227
9,686,599 B2 * 6/2017 Maamoun ........... H04J 14/0257
10,056,973 B2 * 8/2018 Syed .................... H04B 10/032
(Continued)

OTHER PUBLICATIONS

"Routing and Spectrum Assignment based on probabilistic spectrum availability", An IP.com Prior Art Database Technical Disclosure Authors et. al.: Disclosed Anonymously IP.com No. IPCOM000262421D IP.com Electronic Publication Date: May 28, 2020, May 28, 2020, 16 pgs.
(Continued)

*Primary Examiner* — Jai M Lee
(74) *Attorney, Agent, or Firm* — Guntin & Gust, PLC; Kenneth S. Kwan

(57) ABSTRACT

Aspects of the subject disclosure may include, for example: obtaining first data indicative of first parallel links between a first pair of network nodes, the first data comprising a first indication of first available frequency slot(s) for a first one of the first parallel links and a second indication of second available frequency slot(s) for a second one of the first parallel links; obtaining second data indicative of a second link between a second pair of network nodes, the second data comprising a third indication of third available frequency slot(s) for the second link; selecting (as a selected link) the first one or the second one of the first parallel links, the selecting being in accordance with an availability in the selected link of a particular available frequency slot; and outputting a route including the selected link and the second link. Other embodiments are disclosed.

20 Claims, 13 Drawing Sheets

Red corresponds to spectrum already used. Green corresponds to available spectrum. The width of the SNC to deploy is represent by this blue rectangle:

Local available spectrum

(56) References Cited

U.S. PATENT DOCUMENTS

| | | | | |
|---|---|---|---|---|
| 10,476,756 | B2 * | 11/2019 | Bruno | H04L 47/83 |
| 10,516,482 | B1 * | 12/2019 | Schmogrow | H04J 14/0271 |
| 2022/0103464 | A1 * | 3/2022 | Okada | H04L 45/24 |

OTHER PUBLICATIONS

Vincent , et al., "Scalable Capacity Estimation for Nonlinear Elastic All-Optical Core Networks", https://api.repository.cam.ac.uk/server/api/core/bitstreams/aaa9ee21-b1a0-4242-8835-ccbce3df73bd/content, Feb. 18, 2019, 12 pgs.

* cited by examiner

1000

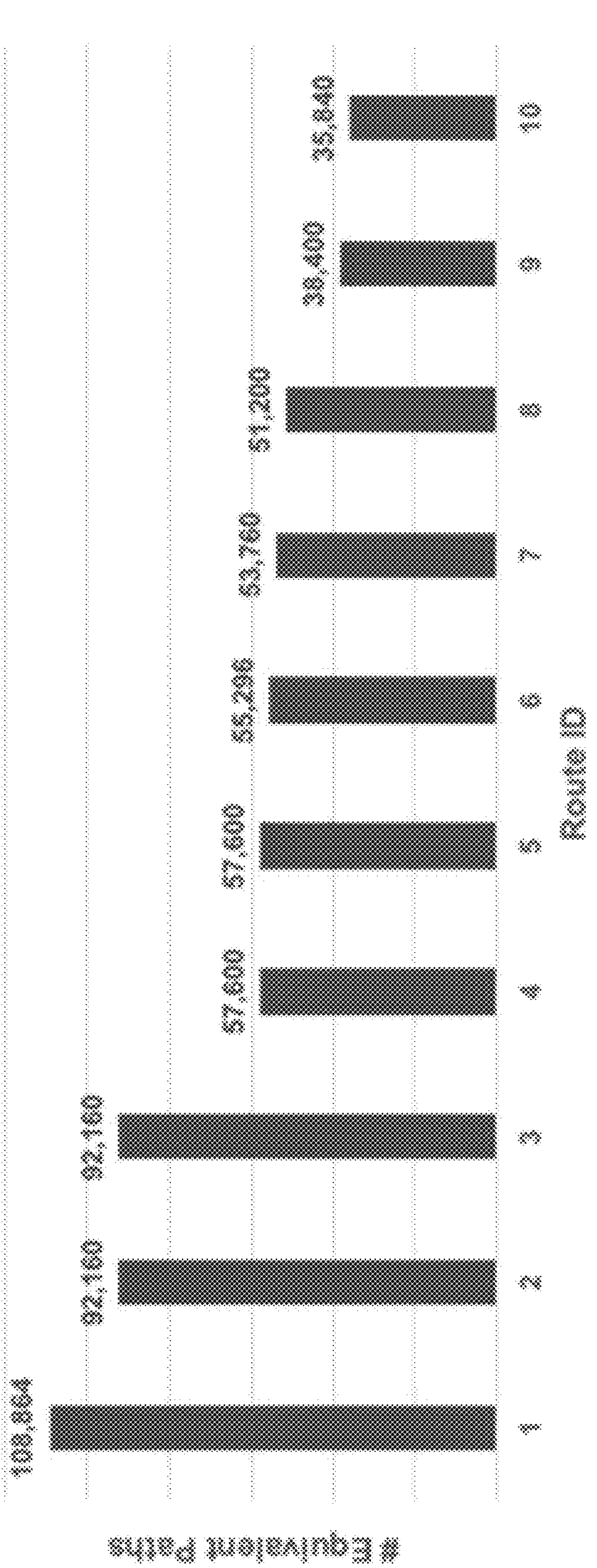
1100
FIG. 1B
(Prior Art)

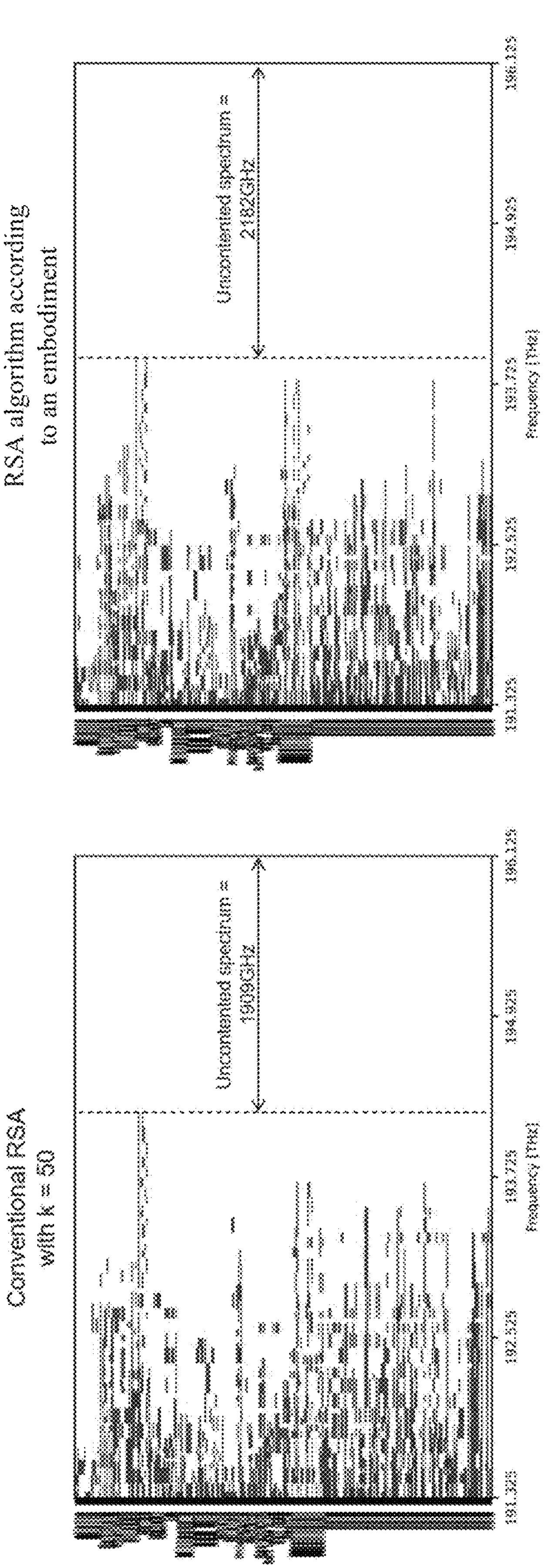
FIG. 2J

Figure 3:
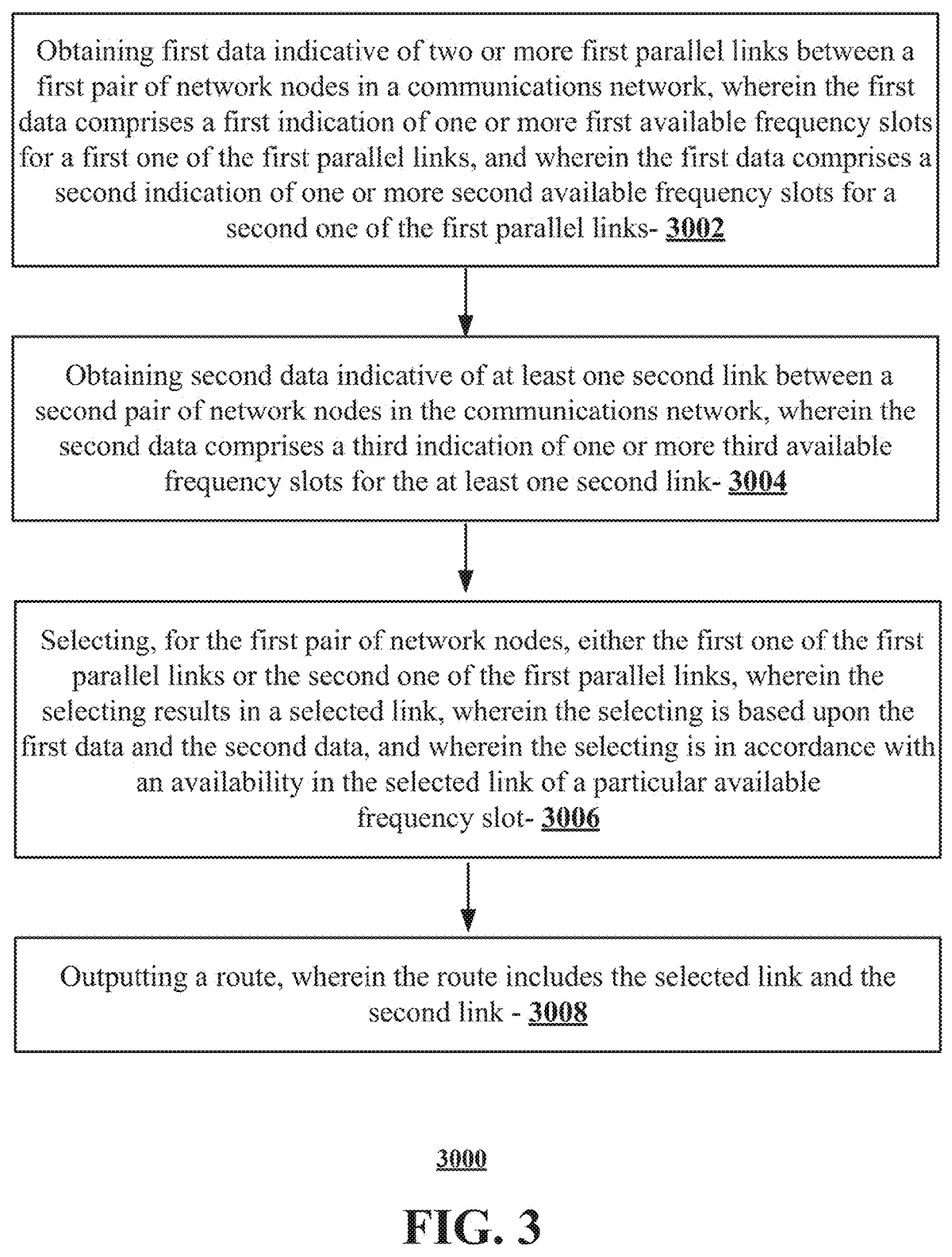

Obtaining first data indicative of two or more first parallel links between a first pair of network nodes in a communications network, wherein the first data comprises a first indication of one or more first available frequency slots for a first one of the first parallel links, and wherein the first data comprises a second indication of one or more second available frequency slots for a second one of the first parallel links- 3002

Obtaining second data indicative of at least one second link between a second pair of network nodes in the communications network, wherein the second data comprises a third indication of one or more third available frequency slots for the at least one second link- 3004

Selecting, for the first pair of network nodes, either the first one of the first parallel links or the second one of the first parallel links, wherein the selecting results in a selected link, wherein the selecting is based upon the first data and the second data, and wherein the selecting is in accordance with an availability in the selected link of a particular available frequency slot- 3006

Outputting a route, wherein the route includes the selected link and the second link - 3008

MULTI-RAIL ROUTING AND SPECTRUM ASSIGNMENT

FIELD OF THE DISCLOSURE

The subject disclosure relates to multi-rail routing and spectrum assignment.

BACKGROUND

To determine the capacity at L0 between a specified pair of nodes, a conventional routing and spectrum assignment (RSA) process iteratively goes through a collection of paths (a sequence of links) in order to identify a contiguous set of unoccupied slots. Certain conventional RSA processes are also used in optimization approaches—e.g., a spectrum defragmentation algorithm to evaluate the optimized plan by measuring the increase in capacity after recoloring/rerouting existing sub-network connections (SNCs). The performance of such conventional RSA algorithms typically depends on the number of explored paths. This number, especially in large networks with parallel rails, can exponentially increase and can result in excruciatingly long process time (the term "rails" used herein can refer to fiber segments (e.g., additional fiber segments) that are deployed between a pair of reconfigurable optical add-drop multiplexer (ROADM) sites (such as to increase capacity); such rails are often referred to as "parallel" since all segments of a group have the same source and destination ROADM). Therefore (in view of the potentially long processing times), the paths in certain conventional RSA processes are either the first k shortest paths (e.g., first 20 shortest paths) or all the paths found within a time limit (e.g., all paths found within 2 min). As a consequence of these conventional strategies, numerous viable paths can be overlooked (leading, for example, to an underestimation of the network's capacity).

As mentioned, parallel rails provide greater flexibility in leveraging the available spectrum on congested links to achieve incremental capacity. However, the number of paths can grow exponentially, and utilizing various conventional methods to determine the actual capacity of the network may become time-consuming. For example, consider a mesh network 1000 (see FIG. 1A) with parallel rails that comprises 13 ROADM nodes. Between source node 1 and the destination node 6, for example, there are three distinct paths:

1-2-3-4-5-6

1-7-8-9-6

1-10-11-12-13-6

For each node path, a photonic SNC can use any combinations of the available rails. The number of possible routes for each node path is thus:

4×5×5×4×5=2000

4×6×5×4=480

4×3×5×6×=1080

Since the number of possible routes is very high, not all routes can typically be evaluated when performing RSA with traditional approaches since a conventional path computing engine (PCE) relying on a k-shortest path algorithm working in real-time would then only evaluate a limited number of routes (on the order of k=10 to 100 routes). In the example of FIG. 1A, this means that only a few rail combinations of the first node path (1-2-3-4-5-6) would be considered (since the number of considered routes is not enough to cover the other node paths).

Further, to minimize fragmentation and maximize overall system capacity, a conventional RSA algorithm would typically select the route that maximizes spectrum compactness. In practice, this usually corresponds to selecting the route that allows to minimize the start slot index of the photonic SNC that is added. This RSA technique is referred to as FF-kSP and usually results in maximum network capacity (see, e.g., R. J. Vincent, D. J. Ives and S. J. Savory, "Scalable Capacity Estimation for Nonlinear Elastic All-Optical Core Networks," in Journal of Lightwave Technology, vol. 37, no. 21, pp. 5380-5391, 1 Nov. 1, 2019).

However, since not all routes can typically be evaluated (e.g., too many route options to cover in multi-rail networks), various conventional algorithms may not assign the spectrum on the best route (therefore not achieving maximum network capacity). In other words, various conventional algorithms typically cannot consider all the rail combinations and route options (therefore they cannot select the best routes and cannot maximize overall network throughput). This is illustrated, for example, in FIG. 1B (which relates to a backbone network). As seen in the graph 1100 of FIG. 1B, there are several deployed node paths with tens of thousands of equivalent paths (up to 108,864). It is worth noting that the average number of paths that are needed to be iterated to find the actual capacity for deployed node paths is 823. Due to the large number of routes, it is practically impossible to iterate and evaluate all of them during a conventional RSA process. Rather, in various conventional RSA processes, a real-time PCE would assess a limited number of paths using either a fixed k-shortest path or a time window.

Referring now to FIG. 1C, this is a block diagram illustrating a certain conventional RSA process 1200. As seen in this figure, the process 1200 comprises four steps for adding a new SNC: Step 1202—Compute k routes in the multi-graph (considering multi-rails); Step 1204—For each route, determine available spectrum; Step 1206—Among k routes, select the route where the start slot is minimized (FF-kSP); and Step 1208—Assign spectrum representing the new SNC on all links that are part of the selected route.

BRIEF DESCRIPTION OF THE DRAWINGS

Reference will now be made to the accompanying drawings, which are not necessarily drawn to scale, and wherein:

FIG. 1B is a block diagram illustrating data associated with a conventional RSA process.

FIGS. 2J-2K are diagrams that illustrate an example, non-limiting embodiment of a routing and spectrum assignment (RSA) process in accordance with various aspects described herein.

FIG. 3 depicts an illustrative embodiment of a method in accordance with various aspects described herein.

DETAILED DESCRIPTION

Figure 1A:
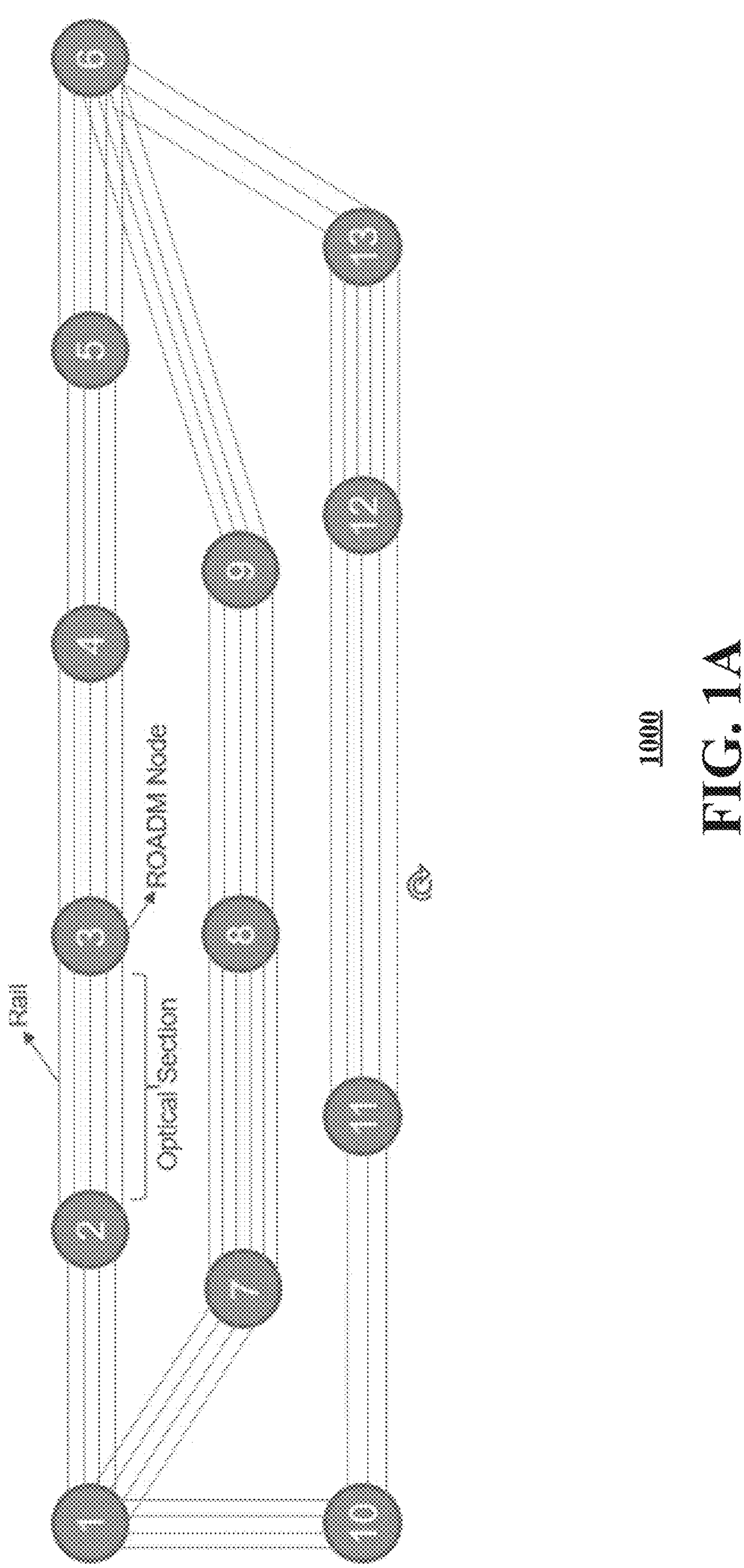
FIG. 1A is a block diagram illustrating a conventional multi-rail network configuration.
Figure 1C:
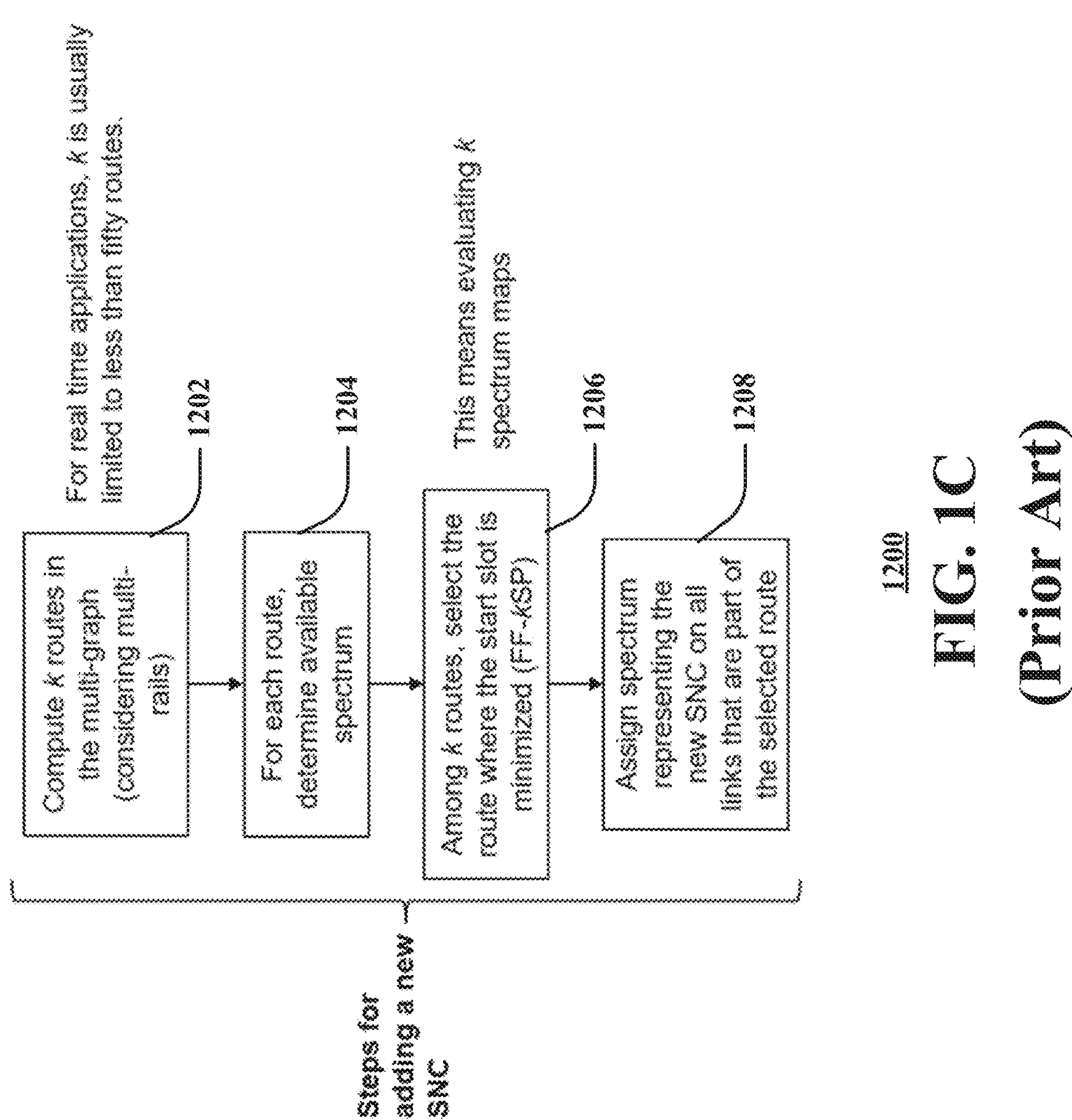
FIG. 1C is a block diagram illustrating a conventional RSA process.

The subject disclosure describes, among other things, illustrative embodiments for multi-rail routing and spectrum assignment. Other embodiments are described in the subject disclosure.

One or more aspects of the subject disclosure include a routing and spectrum assignment algorithm specifically designed for multi-rail networks that facilitates coverage of more routes (and, therefore, can potentially improve spectrum usage and increase network capacity).

One or more aspects of the subject disclosure include a path computing engine (PCE) that utilizes edge-groups, such as parallel rails, in its path computation (rather than utilizing, for example, unique edges). Such a PCE (according to various embodiments) can more efficiently cope with parallel rails.

One or more aspects of the subject disclosure include an RSA technique that considers the presence of parallel rails. Such an RSA technique can (according to various embodiments) provide a spectrum assignment approach that optimizes best fit operations without the need for iteratively considering multiple link paths that share common links. Further, such an RSA technique can (according to various embodiments) provide for enhancing both runtime and accuracy (compared to certain conventional RSA processes) by eliminating (or reducing) the requirement for post-processing and identifying the potential of double-counting capacity on shared optical multiplex section (OMS) segments. Further still, such an RSA technique can (according to various embodiments) provide for presenting a graph transformation technique that locally optimizes spectrum assignment at the rail level and minimizes spectrum fragmentation.

One or more aspects of the subject disclosure include an apparatus, comprising: a processing system including a processor; and a memory that stores executable instructions that, when executed by the processing system, facilitate performance of operations, the operations comprising: obtaining first data indicative of two or more first parallel links between a first pair of network nodes in a communications network, wherein the first data comprises a first indication of one or more first available frequency slots for a first one of the first parallel links, and wherein the first data comprises a second indication of one or more second available frequency slots for a second one of the first parallel links; obtaining second data indicative of at least one second link between a second pair of network nodes in the communications network, wherein the second data comprises a third indication of one or more third available frequency slots for the at least one second link; selecting, for the first pair of network nodes, either the first one of the first parallel links or the second one of the first parallel links, wherein the selecting results in a selected link, wherein the selecting is based upon the first data and the second data, and wherein the selecting is in accordance with an availability in the selected link of a particular available frequency slot; and outputting a route, wherein the route includes the selected link and the second link. In various embodiments, the selected link is selected as a result of the particular available frequency slot corresponding to a matching available frequency slot of the at least one second link. In various embodiments, each of the one or more first available frequency slots is defined by a respective first center frequency and a respective first width; each of the one or more second available frequency slots is defined by a respective second center frequency and a respective second width; and each of the one or more third available frequency slots is defined by a respective third center frequency and a respective third width. In various embodiments, each of the first width, the second width, and the third width is a same width. In various embodiments, at least one of the first width, the second width, and the third width is a different width from at least one of the others. In various embodiments, the particular available frequency slot associated with the selected link has a center frequency that corresponds to a center frequency of one of the third available frequency slots associated with the second link.

Referring now to FIGS. 2A-2F, these diagrams illustrate an example, non-limiting embodiment of a routing and spectrum assignment (RSA) process in accordance with various aspects described herein. More particularly, to illustrate how this RSA process (according to an embodiment) operates, consider the reconfigurable optical add-drop multiplexer (ROADM) network example shown in FIG. 2A. As seen, the network (depicted as multi-graph 2000) of this example includes four ROADM nodes 2002, 2004, 2006, 2008 (the source is node 2002 and the destination is node 2008). In addition, the network of this example includes three optical sections (there are three rails between nodes 2002 and 2004; two rails between nodes 2004 and 2006; and three rails between nodes 2006 and 2008).

Figure 2A:
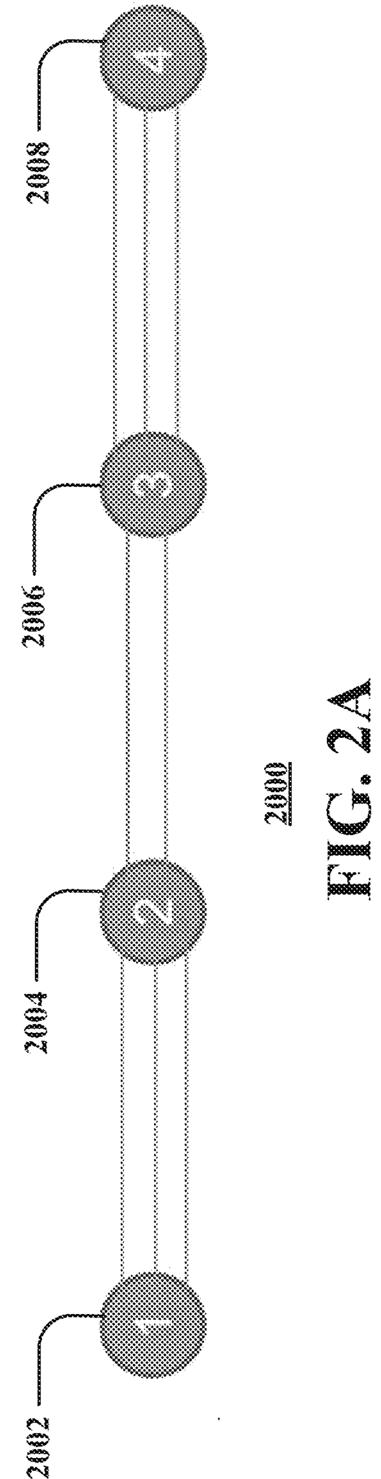
FIGS. 2A-2F are diagrams that illustrate an example, non-limiting embodiment of a routing and spectrum assignment (RSA) process in accordance with various aspects described herein.
Figure 2B:
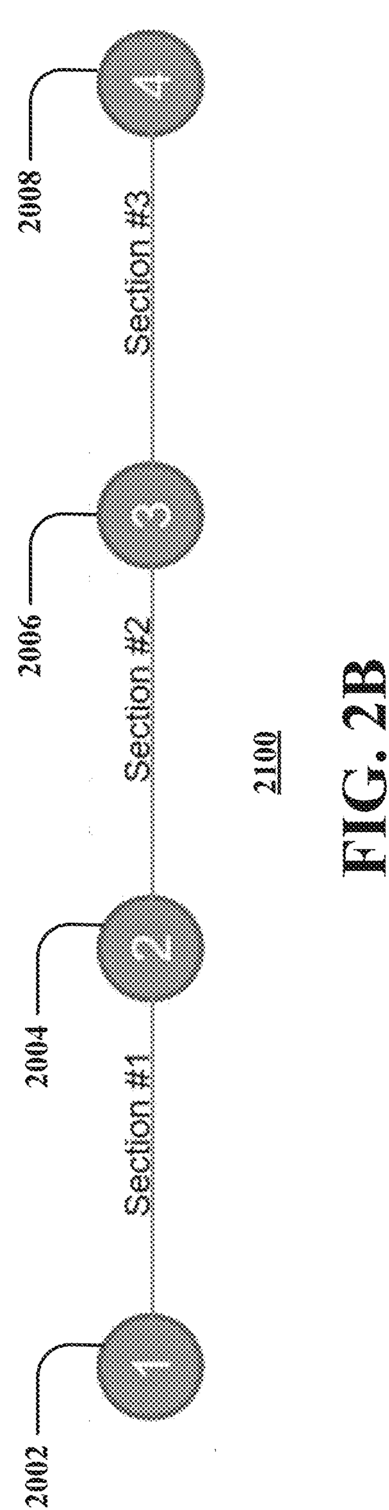

Referring now more particularly to FIG. 2B, it is seen that the first step in this example process is to transform the multi-graph 2000 of FIG. 2A into a simple graph 2100. In this example, there is only one possible route (however, in a mesh network, after transforming the multi-graph to a single graph, there can be multiple route options).

Figure 2C:
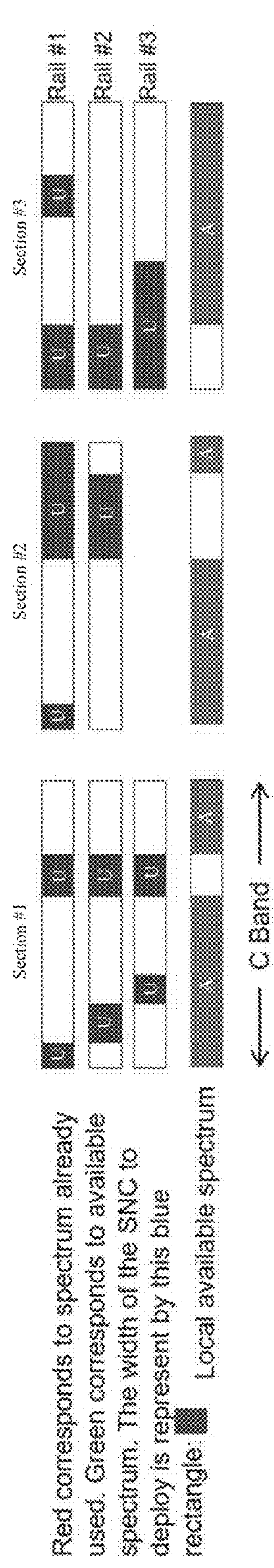

Referring now more particularly to FIG. 2C, it is seen that the next step in this example process is to generate the local spectrum for each section (see section #1, section #2, and section #3 of FIG. 2B), by considering the spectrum usage on each rail and by considering the channel width of the sub-network connection (SNC) to deploy. In this embodiment, it is necessary to determine the local available spectrum as a function of the Sub-Network Connection Group (SNCG) size (since the available slots will not necessarily be the same for different SNCG width). In this FIG. 2C, the red slots (marked with a "U") correspond to spectrum that is already used; the green spectrum (marked with an "A") corresponds to available spectrum.

Figure 2D:
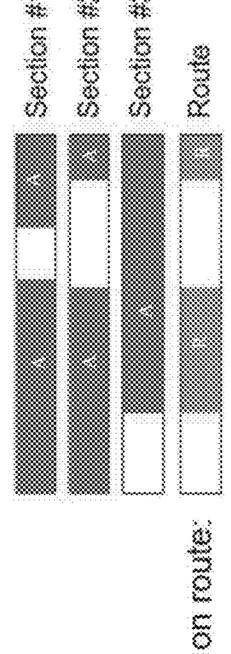

Referring now more particularly to FIG. 2D, it is seen that the next step in this example process is to determine the available frequency slots on the route by combining the local available spectrum. Spectrum is available on the route only if available on all sections. In this FIG. 2D, the green spectrum (marked with an "A") again corresponds to available spectrum; the spectrum available on the route is indicated in orange (marked with an "R") and represents the overall available spectrum.

Figure 2E:
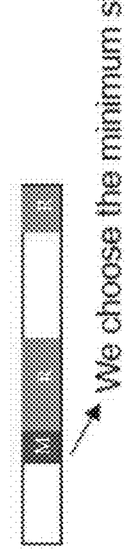

Referring now more particularly to FIG. 2E, it is seen that the next step in this example process is to maximize spectrum compactness. In this embodiment, such maximizing is done by choosing the minimum start frequency. In this FIG. 2E, the blue spectrum with the minimum start frequency (marked with an "M") corresponds to the new spectrum used by the SNC being added; the remaining spectrum available on the route is indicated in orange (marked with an "R").

Figure 2F:
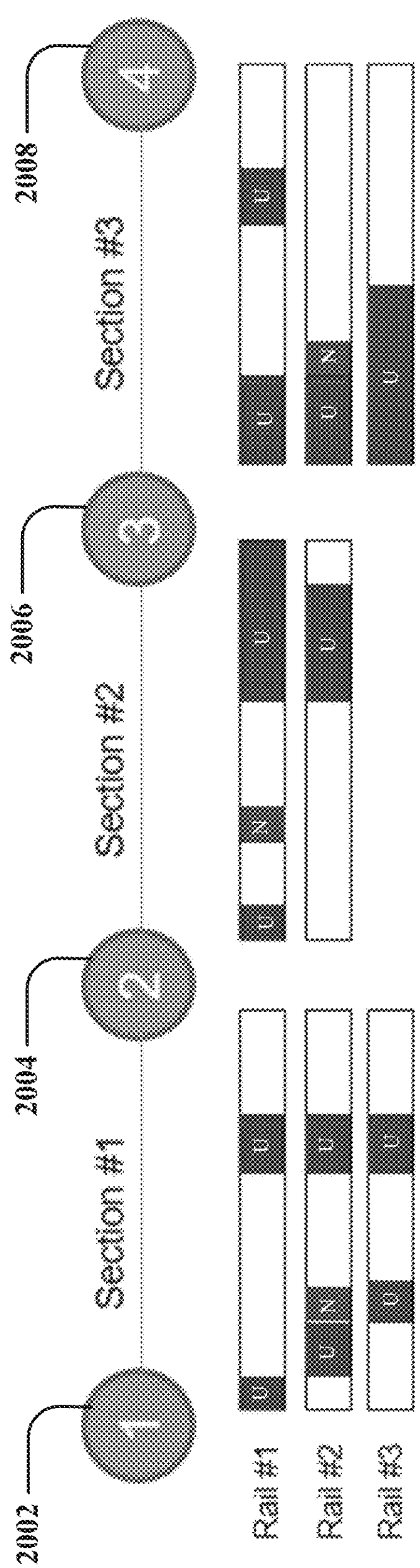

Referring now more particularly to FIG. 2F, it is seen that the next step in this example process is to assign the spectrum on each rail, according to the start frequency slot determined during the previous step. For clarity, this FIG. 2F incudes the elements of simple graph 2100 of FIG. 2B. Further, in this FIG. 2F, the blue spectrum (marked with an "N") is used by the new SNC; the red spectrum (marked with a "U") is already used.

In various embodiments, the spectrum assignment is done locally at each section by choosing the rail among the N possible rails that minimizes spectrum fragmentation. Different measure of spectrum fragmentation can be used, for example, the spectrum availability metric (see, e.g., "Routing and Spectrum Assignment Based on Probabilistic Spectrum Availability"—available at https://priorart.ip.com/IP-COM/000262421/Routing-and-Spectrum-Assignment-based-on-probabilistic-spectrum-availability). The fragmentation level after adding the new SNC is thus determined for each rail in each optical multiplex section (OMS). Spectrum is assigned on the rail that adding the new SNC causes the least fragmentation. In this example (see FIG. 2F) for the 1st OMS, rail #2 is chosen, as this minimizes overall fragmentation. For the 2nd OMS, rail #1 is chosen for the same reason. And for the 3rd OMS, rail #2 is used since fragmentation is then minimized (minimizing network fragmentation allows to fit more SNCs in the spectrum and to increase overall capacity).

Figure 2G:
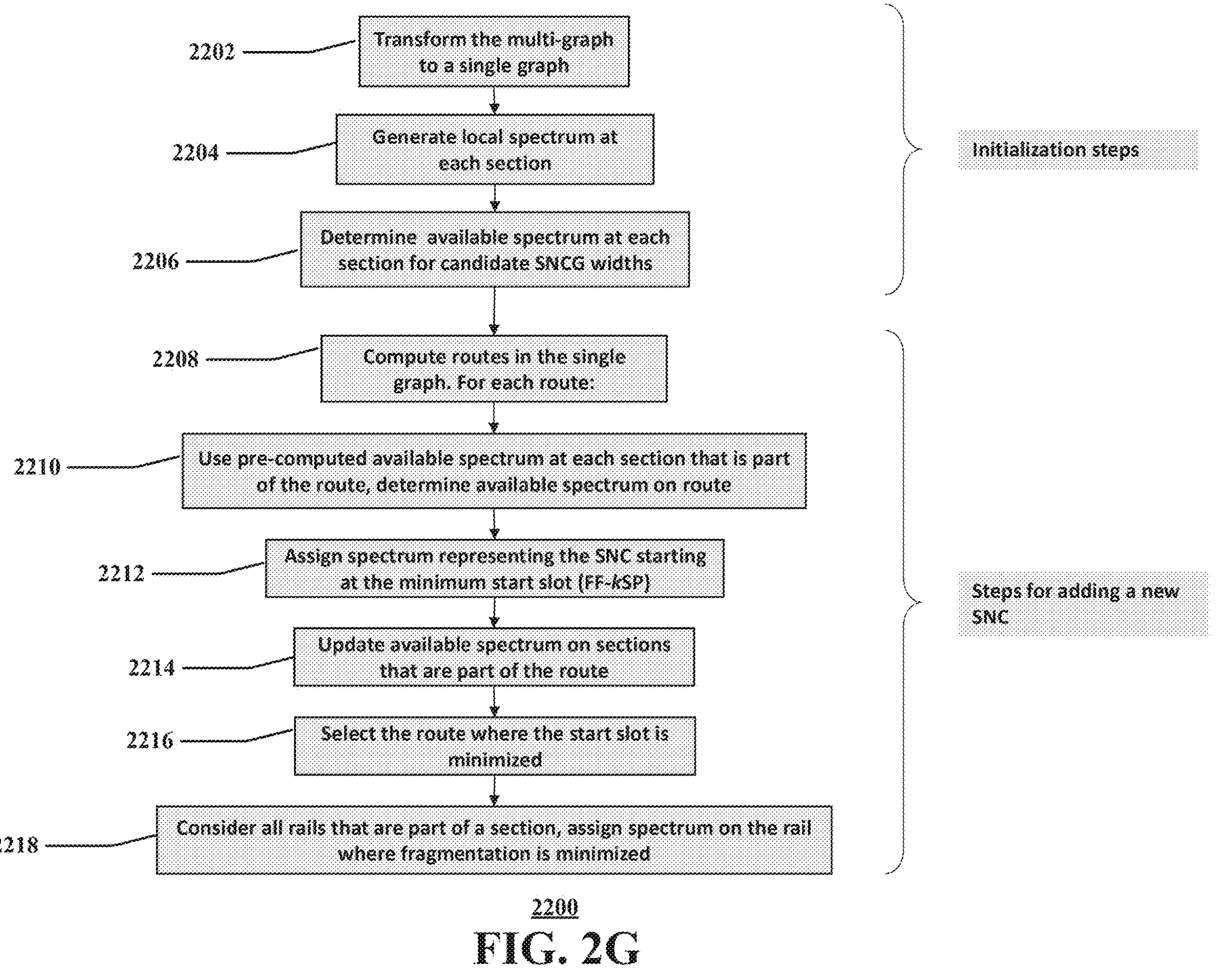
FIG. 2G is a diagram that illustrates an example, non-limiting embodiment of an RSA process in accordance with various aspects described herein.

Referring now to FIG. 2G, this is a diagram illustrating an example, non-limiting embodiment of an RSA process 2200 in accordance with various aspects described herein. As seen in this figure, the process 2200 comprises three initialization steps: Step 2202—Transform the multi-graph into a single graph; Step 2204—Generate local spectrum at each section; and Step 2206—Determine available spectrum at each section for candidate SNCG widths.

Still referring to FIG. 2G, it is seen that after the initialization steps, the process 2200 comprises six steps for adding a new SNC: Step 2208—Compute routes in the single graph; Step 2210—Using pre-computed available spectrum at each section that is part of the route, determine available spectrum on the route; Step 2212—Assigning spectrum representing the SNC starting at the minimum start slot (FF-kSP); Step 2214—Update available spectrum on sections that are part of the route; Step 2216—Select the route where the start slot is minimized; and Step 2218—Considering all rails that are part of a section, assign spectrum on the rail where fragmentation is minimized.

In various embodiments, a slot can correspond to a single channel or to a "super channel" (that is, multiple channels).

In various embodiments, fragmentation computation can be carried out locally, such as (for example) by assigning a new channel on rail one; computing the resulting fragmentation; then do the same on rail two and again compute the resulting fragmentation; and then iteratively repeating the process as necessary (ultimately choosing the option that minimizes fragmentation after trying different combinations).

In various embodiments, each time that it is desired to add a new SNC, the process can comprise computing the different routes that are available in the network.

Reference will now be made to a performance showcase and numerical results (based on simulations) according to various embodiments. This discussion will be directed to the performance of various embodiments on three use cases. In the first use case, an algorithm according to an embodiment is applied to a small network where traffic matrix is given, and the goal is to route all services with minimum spectrum requirement. The second use case illustrates the impact of an algorithm according to an embodiment in achieving higher packing efficiency on a large backbone. The third use case is again based on a large backbone network with several parallel rails in which an algorithm according to an embodiment evaluates the existing capacity of the network (and the results are compared with a certain conventional RSA approach).

Figure 2I:
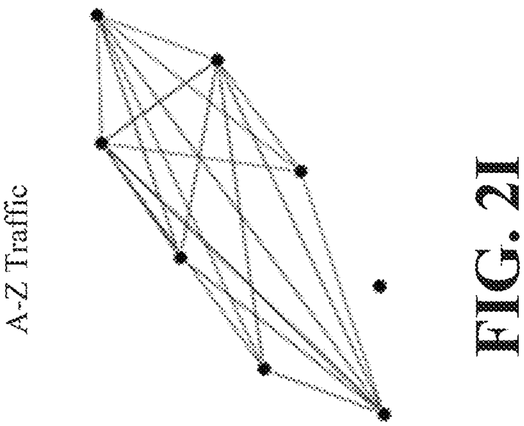
FIGS. 2H-2I are diagrams that illustrate an example, non-limiting embodiment of a routing and spectrum assignment (RSA) process in accordance with various aspects described herein.
Figure 2H:
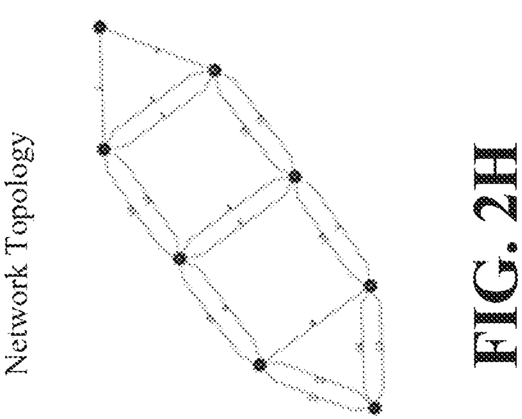

With reference now more particularly to the first use case, FIGS. 2H and 2I are provided in order to illustrate an example showing how in a small network using parallel rails an algorithm according to an embodiment is efficient. (FIG. 2H shows a network topology and FIG. 2I shows A-Z Traffic). The traffic consisted in 7 photonic SNCs and 112 photonic SNCPs. Using an algorithm according to an embodiment all the traffic was added without adding any new parallel rail (thus avoiding this cost). The use of certain conventional techniques and existing tools (e.g., existing tools utilizing conventional RSA) could only support 92% of the traffic on this topology.

Figure 2K:
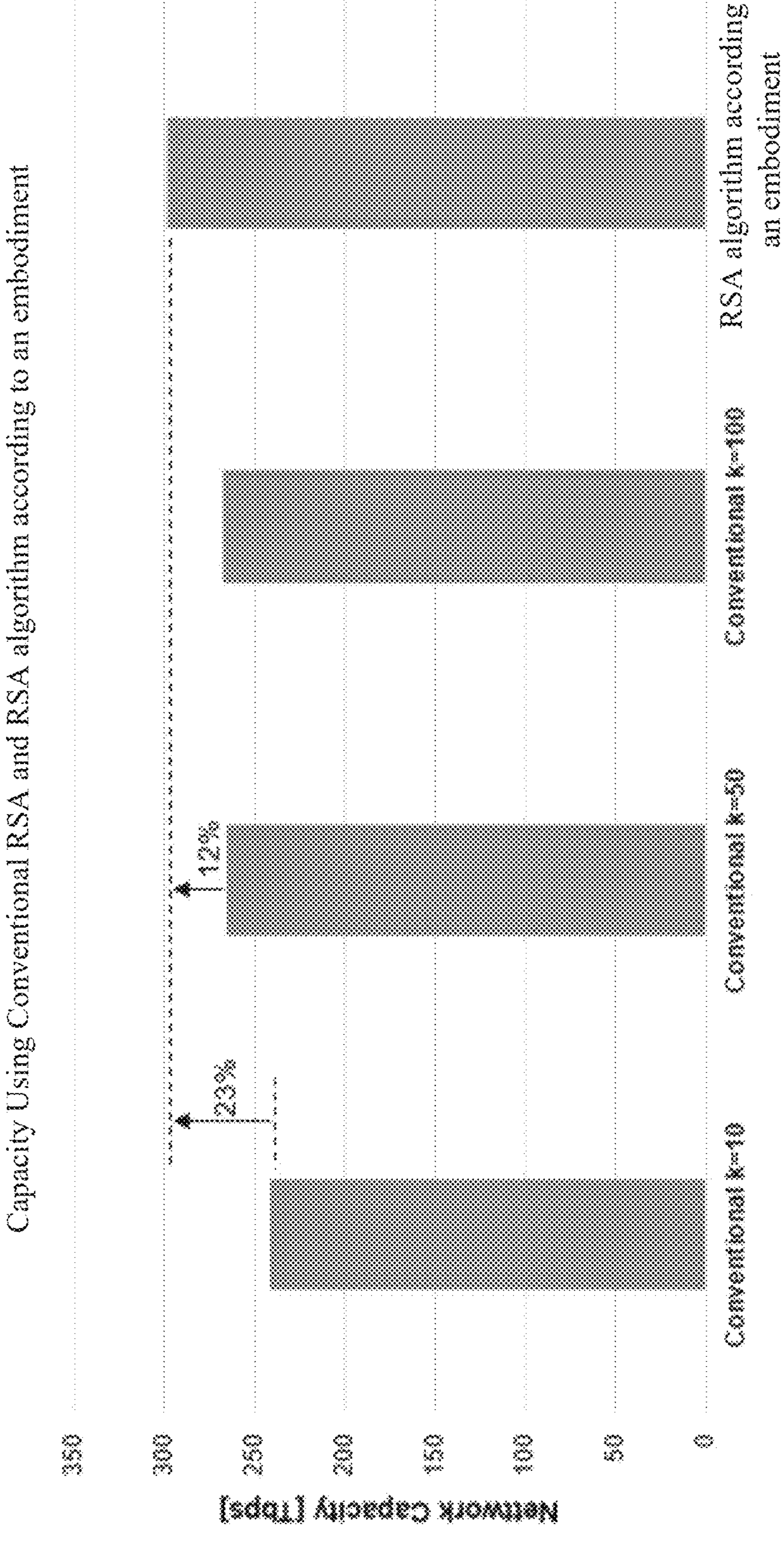

With reference now more particularly to the second use case, FIGS. 2J and 2K are provided in order to illustrate an example showing achievement (using an RSA algorithm according to an embodiment) of higher packing efficiency on a large backbone. In FIG. 2J, the left graph shows (for a certain conventional RSA) a spectrum map of OMS vs frequency and the right graph shows (using an RSA algorithm according to an embodiment) a spectrum map of OMS vs frequency. The RSA algorithm according to an embodiment results in a 14% increase in uncontended spectrum (indicating that the RSA algorithm according to an embodiment achieves better packing efficiency). Further, to estimate capacity, SNCs were sequentially and randomly added to the network. 100 simulation runs were performed and a report was made on the average capacity. The blocking point was set to 2 SNCs. The graph in FIG. 2K indicates network capacity when using a conventional approach, for different values of k (k=number of considered routes), and when using an RSA algorithm according to an embodiment. When comparing to the case where 10 routes are considered, the RSA algorithm according to an embodiment increases capacity by 23%. When comparing to the case where 50 routes are considered, the RSA algorithm according to an embodiment increases capacity by 12%. As indicated by the graph in FIG. 2K, using the conventional approach, and doubling the number of considered routes from 50 to 100, has little impact on network capacity. In order to achieve the same capacity as the RSA algorithm according to an embodiment, k would need to be increased to 4000, which is not practical for a layer 0 real-time path computation engine. Not only would 4000 routes need to be computed in real-time, but 4000 spectrum maps would also need to be evaluated to select the route that minimizes the slot index. Furthermore, the use of the conventional approach does not typically lead to a reduction of spectrum fragmentation, which in turn reduces the total network capacity.

Figure 2L:
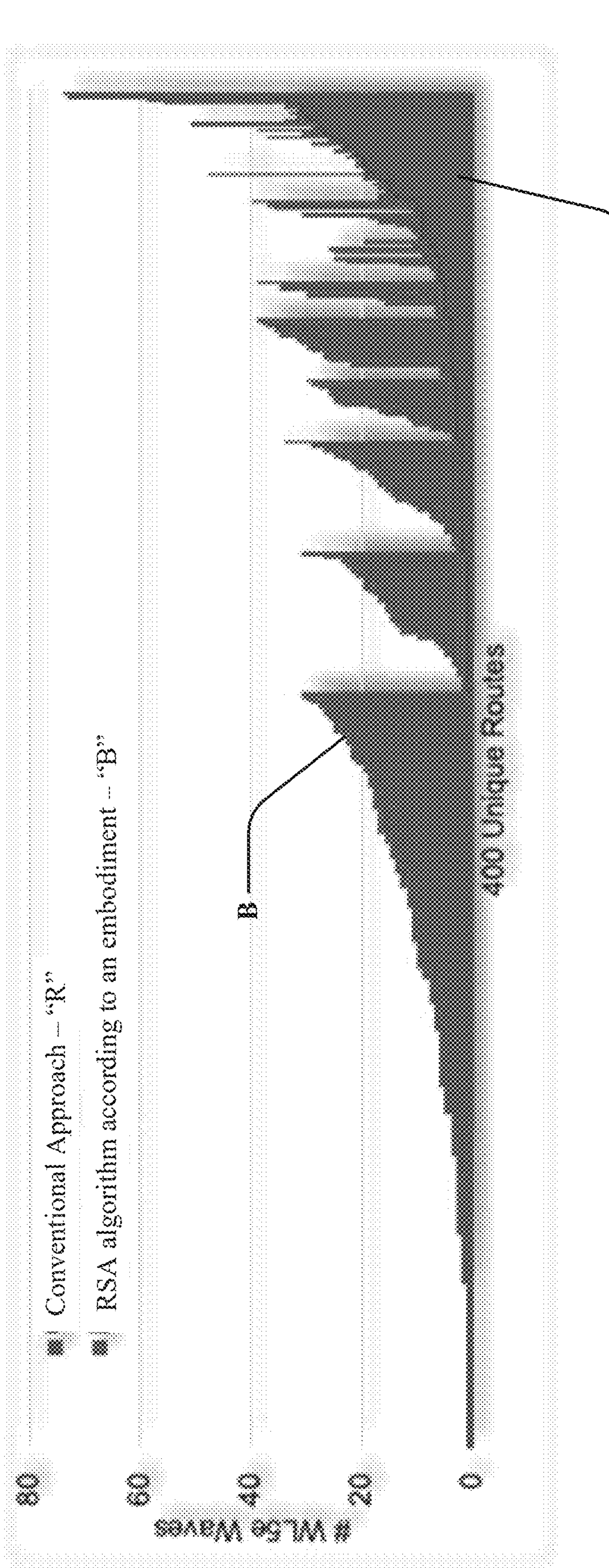
FIG. 2L is a diagram that illustrates an example, non-limiting embodiment of a routing and spectrum assignment (RSA) process in accordance with various aspects described herein.

With reference now more particularly to the third use case, FIG. 2L is provided in order to illustrate an example related to a large backbone network with several parallel rails (in this figure, data for a conventional approach is shown in red and has associated therewith the letter "R" as a call-out; further, in this figure, data for an RSA algorithm according to an embodiment is shown in blue and has associated therewith the letter "B" as a call-out). In this example, a backbone network was examined as part of a defragmentation project (bandwidth recovery problem). Considering the conventional approach and the incomplete picture of the existing capacity it provides, there were many paths in urgent need of optimization (to make room for the next incoming service requests). Use of an RSA algorithm according to an embodiment facilitated uncovering the actual available capacity. As shown in FIG. 2L, an increase in capacity on 400 routes is observed considering the flexibility of parallel rails. It is important to highlight that the capacity on more than 200 routes was 0 while the RSA algorithm according to an embodiment returned a greater capacity. On average, a system can light up 10 more waves per route (overall 4,000 more WL5e waves).

Referring now to FIG. 3, this depicts an illustrative embodiment of a method 3000 in accordance with various aspects described herein. As seen in this figure, step 3002 comprises obtaining first data indicative of two or more first parallel links between a first pair of network nodes in a communications network, wherein the first data comprises a first indication of one or more first available frequency slots for a first one of the first parallel links, and wherein the first data comprises a second indication of one or more second available frequency slots for a second one of the first parallel links. Next, step 3004 comprises obtaining second data indicative of at least one second link between a second pair of network nodes in the communications network, wherein the second data comprises a third indication of one or more third available frequency slots for the at least one second link. Next, step 3006 comprises selecting, for the first pair of network nodes, either the first one of the first parallel links or the second one of the first parallel links, wherein the selecting results in a selected link, wherein the selecting is based upon the first data and the second data, and wherein the selecting is in accordance with an availability in the selected link of a particular available frequency slot. Next, step 3008 comprises outputting a route, wherein the route includes the selected link and the second link. In various embodiments, the operations further comprise obtaining network topology data that includes the first pair of network nodes and the second pair of network nodes. In various embodiments, the obtaining the first data and the obtaining the second data are based upon the obtaining of the network topology data.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

As described herein, various embodiments can provide for multi-rail routing and spectrum assignment (e.g., to efficiently handle both routing and spectrum assignment on parallel rails). In various embodiments, a combination of single and parallel rails can be supported.

As described herein, various embodiments can provide a mechanism to facilitate maximization of a user's investment by increasing the overall capacity that their network can handle.

As described herein, various embodiments can provide a mechanism to facilitate an optimized RSA approach that supports parallel rails, facilitating maximization of L0 network capacity and/or restoration of performance.

As described herein, various embodiments can provide a mechanism to prioritize the parts of the network that require immediate capacity recovery and enhancement.

As described herein, various embodiments can provide a mechanism to minimize disruption and/or involve fewer affected services.

As described herein, various embodiments can provide for faster execution time. The running time improvement can be proportional to the number of routes (k) that would otherwise be considered in a conventional approach. For example, if k=100 for a single node path comprising multiple parallel rails, an RSA algorithm according to an embodiment should reduce execution time by a factor close to 100. This is because most of the complexity of such a conventional RSA algorithm and of an RSA algorithm according to an embodiment resides in path computation.

As described herein, various embodiments can provide for better packing efficiency, which translates into higher achievable capacity (since various embodiments consider all route permutations and locally minimize spectrum fragmentation). This also allows (according to various embodiments) better mesh-restoration performance which translates into higher service availability.

As described herein, various embodiments can provide for an accurate capacity profile of the network and reducing the need for network optimization and network resource expansion, also reducing the need for costly spectrum defragmentation.

As described herein, various embodiments can provide an RSA algorithm that minimizes required computation time and/or required computation power.

As described herein, various embodiments can provide an RSA algorithm that implements aggregation (e.g., via calculations) and spectrum management.

As described herein, various embodiments can provide an RSA algorithm that operates in the context of flexible grid systems and/or fixed grid systems. In one example, the channel resolution can be 6.25 gigahertz. In various examples, the optical communication system can cover the C band and/or the L band.

As described herein, various embodiments can provide an RSA algorithm that performs defragmentation in order to try and minimize any gap in the spectrum between a new channel and one or more existing channels (that is, trying to pack the spectrum most efficiently).

As described herein, various embodiments can provide an RSA algorithm that aims to reduce fragmentation (e.g., by choosing the rail that minimizes overall fragmentation).

As described herein, although various conventional approaches exist for constructing a smaller graph and enhancing routing operations, such conventional approaches do not necessarily benefit the RSA problem (this is because spectrum assignment requires an algorithm to preserve the spectrum availability on each link; consequently, a conventional algorithm would typically need to re-evaluate all equivalent paths that were eliminated during graph reduction operations to compute the actual capacity between the source and the destination, thus nullifying the graph reduction efforts). In contrast, a spectrum assignment engine according to various embodiments can respect the continuity and contiguity of the slots-factors that are easily overlooked if we simply apply conventional graph reduction operations and aggregate parallel rails with their capacities).

Figure 4:
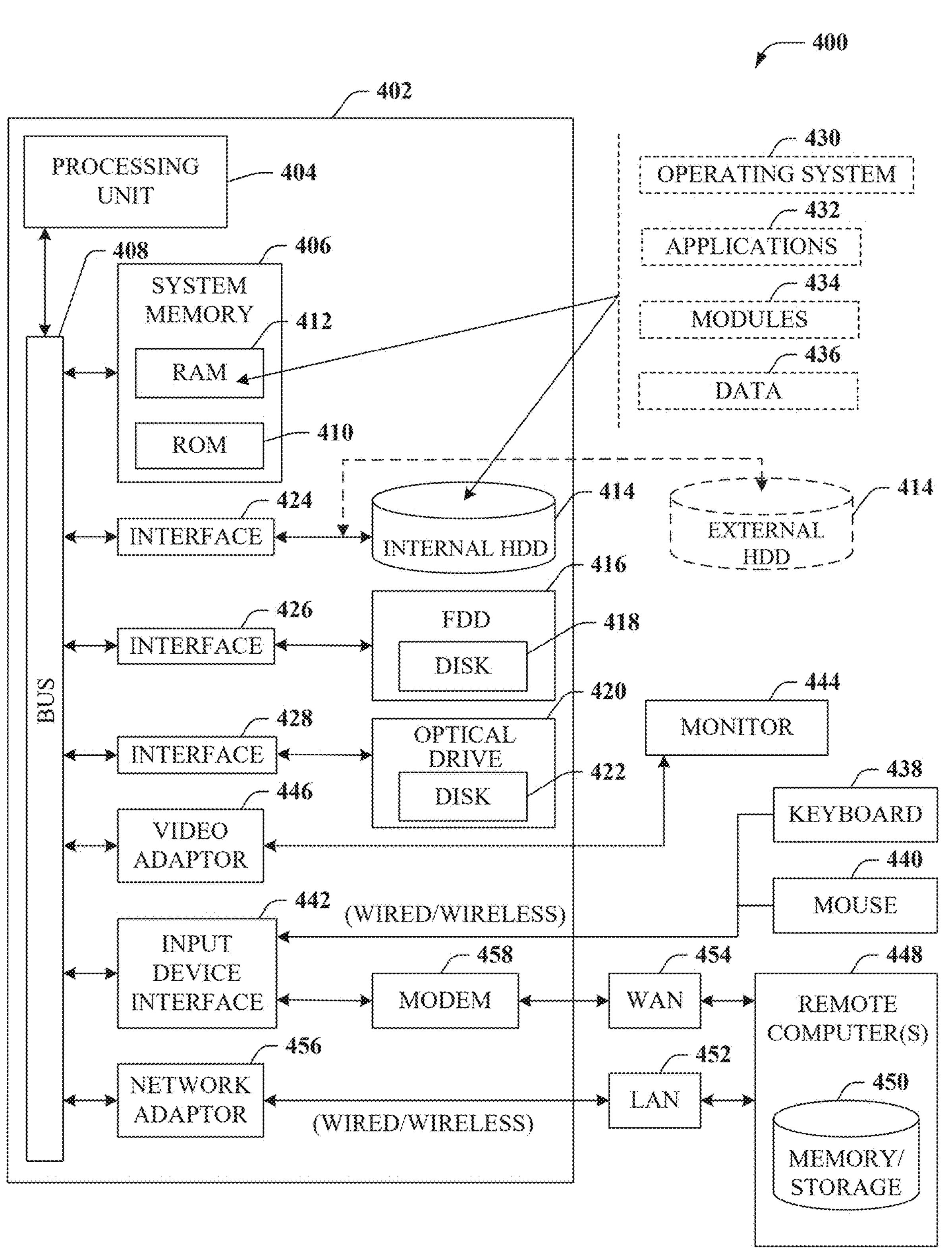
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. For example, computing environment 400 can facilitate in whole or in part multi-rail routing and spectrum assignment.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data. Computer-readable storage media can comprise the widest variety of storage media including tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. An apparatus, comprising:

a processing system including a processor; and a memory that stores executable instructions that, when executed by the processing system, facilitate performance of operations, the operations comprising:

obtaining first data indicative of two or more first parallel links between a first pair of network nodes in a communications network, wherein the first data comprises a first indication of one or more first available frequency slots for a first one of the first parallel links, and wherein the first data comprises a second indication of one or more second available frequency slots for a second one of the first parallel links;

obtaining second data indicative of at least one second link between a second pair of network nodes in the communications network, wherein the second data comprises a third indication of one or more third available frequency slots for the at least one second link;

selecting, for the first pair of network nodes, either the first one of the first parallel links or the second one of the first parallel links, wherein the selecting results in a selected link, wherein the selecting is based upon the first data and the second data, and wherein the selecting is in accordance with an availability in the selected link of a particular available frequency slot; and outputting a route, wherein the route includes the selected link and the second link.

2. The apparatus of claim 1, wherein the communications network comprises a fiber optic communications network.

3. The apparatus of claim 2, wherein each node of the first pair of network nodes and each node of the second pair of network nodes is a respective reconfigurable optical add-drop multiplexer (ROADM) node.

4. The apparatus of claim 2, wherein each link of the first parallel links and the second link comprises a respective fiber optic link.

5. The apparatus of claim 1, wherein the operations further comprise obtaining network topology data that includes the first pair of network nodes and the second pair of network nodes.

6. The apparatus of claim 5, wherein the obtaining the first data and the obtaining the second data are based upon the obtaining of the network topology data.

7. The apparatus of claim 1, wherein:

the first pair of network nodes comprises one endpoint node and an intermediate node; and the second pair of network nodes comprises another endpoint node and the intermediate node.

8. The apparatus of claim 1, wherein the selected link is selected as a result of the particular available frequency slot corresponding to a matching available frequency slot of the at least one second link.

9. The apparatus of claim 1, wherein:

each of the one or more first available frequency slots is defined by a respective first center frequency and a respective first width;

each of the one or more second available frequency slots is defined by a respective second center frequency and a respective second width; and each of the one or more third available frequency slots is defined by a respective third center frequency and a respective third width.

10. The apparatus of claim 9, wherein each of the first width, the second width, and the third width is a same width.

11. The apparatus of claim 9, wherein at least one of the first width, the second width, and the third width is a different width from at least one of the others.

12. The apparatus of claim 1, wherein the particular available frequency slot associated with the selected link has a center frequency that corresponds to a center frequency of one of the third available frequency slots associated with the second link.

13. The apparatus of claim 1, wherein the operations further comprise:

obtaining third data indicative of two or more third parallel links between a third pair of network nodes in the communications network, wherein the third data comprises a fourth indication of one or more fourth available frequency slots for a first one of the third parallel links, and wherein the third data comprises a fifth indication of one or more fifth available frequency slots for a second one of the third parallel links; and selecting, for the third pair of network nodes, either the first one of the third parallel links or the second one of the third parallel links, wherein the selecting for the third pair of network nodes results in a second selected link, wherein the selecting for the third pair of network nodes is based upon the first data, the second data, and the third data, and wherein the selecting for the third pair of network nodes is in accordance with an availability in the second selected link of a second particular available frequency slot;

wherein the route that is output further includes the second selected link.

14. The apparatus of claim 13, wherein:

the selected link is selected as a first result of the particular available frequency slot corresponding to a matching available frequency slot of the at least one second link and the second selected link is selected as a second result of the second particular available frequency slot also corresponding to the matching available frequency slot of the at least one second link; and the selecting for the first pair of network nodes and the selecting for the third pair of network nodes is in accordance with an optimized RSA scheme supporting multi-rail networks.

15. The apparatus of claim 14, wherein the optimized RSA scheme supporting multi-rail networks takes into account: the one or more first available frequency slots; the one or more second available frequency slots, the one or more third available frequency slots; the one or more fourth available frequency slots; the one or more fifth available frequency slots; or any combination thereof.

16. A non-transitory machine-readable medium comprising executable instructions that, when executed by a processing system including a processor, facilitate performance of operations, the operations comprising:

obtaining first data indicative of two or more first parallel links between a first pair of network nodes in a communications network, wherein the first data comprises a first indication of one or more first available frequency slots for a first one of the first parallel links, and wherein the first data comprises a second indication of one or more second available frequency slots for a second one of the first parallel links;

obtaining second data indicative of at least one second link between a second pair of network nodes in the communications network, wherein the second data comprises a third indication of one or more third available frequency slots for the at least one second link;

selecting, for the first pair of network nodes, either the first one of the first parallel links or the second one of the first parallel links, wherein the selecting results in a selected link, wherein the selecting is based upon the first data and the second data, and wherein the selecting is in accordance with an availability in the selected link of a particular available frequency slot; and outputting a route, wherein the route includes the selected link and the second link.

17. The non-transitory machine-readable medium of claim 16, wherein:

the communications network comprises a fiber optic communications network;

each node of the first pair of network nodes and each node of the second pair of network nodes is a respective reconfigurable optical add-drop multiplexer (ROADM) node; and each link of the first parallel links and the second link comprises a respective fiber optic link.

18. The non-transitory machine-readable medium of claim 16, wherein:

the first pair of network nodes comprises one endpoint node;

the second pair of network nodes comprises another endpoint node; and the first pair of network nodes and the second pair of network nodes share an intermediate node between the one endpoint node and the another endpoint node.

19. A method, comprising:

obtaining, by a processing system including a processor, first data indicative of two or more first parallel links between a first pair of network nodes in a communications network, wherein the first data comprises a first indication of one or more first available frequency slots for a first one of the first parallel links, and wherein the first data comprises a second indication of one or more second available frequency slots for a second one of the first parallel links;

obtaining, by the processing system, second data indicative of at least one second link between a second pair of network nodes in the communications network, wherein the second data comprises a third indication of one or more third available frequency slots for the at least one second link;

selecting, by the processing system, for the first pair of network nodes, either the first one of the first parallel links or the second one of the first parallel links, wherein the selecting results in a selected link, wherein the selecting is based upon the first data and the second data, and wherein the selecting is in accordance with an availability in the selected link of a particular available frequency slot; and outputting, by the processing system, a route, wherein the route includes the selected link and the second link.

20. The method of claim 19, wherein the selected link is selected as a result of the particular available frequency slot corresponding to a matching available frequency slot of the at least one second link.

* * * * *